United States Patent
Czekala et al.

(10) Patent No.: US 8,550,037 B2
(45) Date of Patent: *Oct. 8, 2013

(54) IGNITION CONTROL FOR REFORMATE ENGINE

(75) Inventors: Michael Damian Czekala, Canton, MI (US); Thomas G. Leone, Ypsilanti, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,855

(22) Filed: Jun. 5, 2012

(65) Prior Publication Data

US 2012/0240872 A1 Sep. 27, 2012

Related U.S. Application Data

(63) Continuation of application No. 12/756,792, filed on Apr. 8, 2010, now Pat. No. 8,191,514.

(51) Int. Cl.
*F02B 43/08* (2006.01)
*F02P 5/00* (2006.01)

(52) U.S. Cl.
USPC .......................... 123/3; 123/406.3

(58) Field of Classification Search
USPC ............. 123/1 A, 2, 3, 406.3, 406.31, 406.45
See application file for complete search history.

(56) References Cited

U.S. PATENT DOCUMENTS

| | | | |
|---|---|---|---|
| 4,175,523 A * | 11/1979 | Noguchi et al. | ............ 123/3 |
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |

(Continued)

FOREIGN PATENT DOCUMENTS

| | | |
|---|---|---|
| EP | 2048339 A1 | 4/2009 |
| JP | 52072021 A | 6/1977 |

OTHER PUBLICATIONS

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 pages.

(Continued)

*Primary Examiner* — Noah Kamen
(74) *Attorney, Agent, or Firm* — Julia Voutyras; Alleman Hall McCoy Russell & Tuttle LLP (57) ABSTRACT

During operation of a spark ignition engine, an ignition system produces an output (e.g., breakdown voltage, peak secondary coil current, and spark duration) used to combust a charge (e.g., mixture of air and fuel) in an engine cylinder. Ignition output is important to consider in engines including a second fuel with high ignitability, for example in engines with a fuel reformer system. Example methods, devices and systems are included for adjusting ignition output.

12 Claims, 4 Drawing Sheets

(56) References Cited

U.S. PATENT DOCUMENTS

| | | |
|---|---|---|
| 6,058,906 A | 5/2000 | Yoshino |
| 6,088,647 A | 7/2000 | Hemberger et al. |
| 6,176,215 B1 | 1/2001 | Baur et al. |
| 6,213,104 B1 | 4/2001 | Ishikiriyama et al. |
| 6,247,449 B1 | 6/2001 | Persson |
| 6,318,306 B1 | 11/2001 | Komatsu |
| 6,334,424 B1 | 1/2002 | Ito |
| 6,349,702 B1 | 2/2002 | Nishiyama |
| 6,390,030 B1 | 5/2002 | Isogawa et al. |
| 6,591,817 B2 | 7/2003 | Deutsch |
| 6,705,295 B1 | 3/2004 | Tarroux et al. |
| 6,711,893 B2 | 3/2004 | Ueda et al. |
| 6,729,301 B2 | 5/2004 | Nakamori et al. |
| 6,751,543 B2 | 6/2004 | Gras et al. |
| 6,851,398 B2 | 2/2005 | Taylor, III et al. |
| 6,964,261 B2 | 11/2005 | Warne et al. |
| 6,988,481 B2 | 1/2006 | Sen et al. |
| 6,990,956 B2 | 1/2006 | Niimi |
| 6,997,142 B2 | 2/2006 | Wakao et al. |
| 7,047,940 B2 | 5/2006 | Niimi |
| 7,089,888 B2 | 8/2006 | Mirji |
| 7,104,244 B2 | 9/2006 | Nishi et al. |
| 7,159,541 B2 | 1/2007 | Wakao et al. |
| 7,203,579 B2 | 4/2007 | Yokota et al. |
| 7,228,841 B2 | 6/2007 | Takemoto et al. |
| 7,261,065 B2 | 8/2007 | Aimoto et al. |
| 7,370,609 B2 | 5/2008 | Kamio |
| 7,454,898 B2 | 11/2008 | Allgeier et al. |
| 7,523,744 B2 | 4/2009 | Ayame |
| 7,530,335 B2 | 5/2009 | Sakurai et al. |
| 8,001,934 B2 | 8/2011 | Leone et al. |
| 8,015,952 B2 | 9/2011 | Pursifull |
| 8,037,850 B2 | 10/2011 | Pursifull |
| 8,041,500 B2 | 10/2011 | Leone |
| 8,118,006 B2 | 2/2012 | Pursifull |
| 8,146,541 B2 | 4/2012 | Surnilla et al. |
| 8,230,826 B2 | 7/2012 | Pursifull et al. |
| 2001/0003977 A1 | 6/2001 | Hayashi et al. |
| 2004/0139944 A1 | 7/2004 | Nakano et al. |
| 2006/0075991 A1 | 4/2006 | Heywood et al. |
| 2008/0010993 A1 | 1/2008 | Morgenstern |
| 2008/0098985 A1 | 5/2008 | Kamio |
| 2008/0141984 A1 | 6/2008 | Haga |
| 2008/0221778 A1 | 9/2008 | Kakuho et al. |
| 2008/0228375 A1 | 9/2008 | Ashida et al. |
| 2008/0282998 A1 | 11/2008 | Kuzuoka et al. |
| 2009/0017987 A1 | 1/2009 | Satou et al. |
| 2009/0030588 A1 | 1/2009 | Yamashita |
| 2009/0043479 A1 | 2/2009 | Noda et al. |
| 2009/0065409 A1 | 3/2009 | Kamio et al. |
| 2009/0071453 A1 | 3/2009 | Stockhausen et al. |
| 2011/0132284 A1 | 6/2011 | Leone et al. |
| 2011/0132286 A1 | 6/2011 | Leone et al. |
| 2011/0132290 A1 | 6/2011 | Leone et al. |
| 2011/0132306 A1 | 6/2011 | Kerns et al. |
| 2011/0137537 A1 | 6/2011 | Leone |

OTHER PUBLICATIONS

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 pages.

Morgenstern, David A., et al., "Low Temperature Reforming of Ethanol over Copper-Plated Randy Nickel: A New Route to Sustainable Hydrogen for Transportation" revised manuscript, 9 pages.

Green Car Congress, "Honda Making Significant Progress on HCCI Engine for Hybrid Application" Oct. 28, 2009, http://www.greencarcongress.com/2005/10/honda_making_si.html, 8 pages.

* cited by examiner

IGNITION CONTROL FOR REFORMATE ENGINE

CROSS REFERENCE TO RELATED APPLICATIONS

The present application is a continuation of U.S. patent application Ser. No. 12/756,792 filed Apr. 8, 2010, now U.S. Pat. No. 8,191,514, the entire contents of which are incorporated herein by reference for all purposes.

TECHNICAL FIELD

The present application relates to ignition system output control in an engine including a second fuel with high ignitability, for example an engine with a reformer system to generate hydrogen-rich fuel.

BACKGROUND AND SUMMARY

During operation of a spark ignition engine, an ignition system produces an output (e.g., breakdown voltage, peak secondary coil current, and spark duration) used to initiate combustion of a charge (e.g., mixture of air and fuel) in an engine cylinder. If the chemical and physical properties of a given charge have lower ignitability, ignition output for combustion is greater than an ignition output for another charge having higher ignitability. Engines including devices and systems, such as a compressor providing boosted air, an exhaust gas recirculation (EGR) system, and variable valve control (VVC) systems controlling, e.g., timing, duration and lift, may all impact charge ignitability, leading to increased ignition system output requirements.

In one approach, an ignition system produces a modular output. High ignition output is used under some conditions, such as during light load operating conditions when spark duration may be increased. Further, during high load and/or high dilution conditions peak secondary current and breakdown voltage may be increased.

The inventors herein have recognized issues with the above described approach. Parasitic efficiency losses are incurred when ignition output is increased, partially cancelling the efficiency benefits of high dilution and/or boosted engines. Further, increasing the range of ignition output may drastically increase ignition systems cost. Further still, without a wide range of ignition system output capabilities, an engine may not aggressively utilize lean burn, EGR, variable valve control, boost, etc. while avoiding misfires, excessive spark plug electrode erosion and the like.

Consequently, systems, devices and methods are disclosed for ignition control for an engine, such as a multi-fuel engine with a reformer for generating reformed fuel. In one example, a method for an engine includes adjusting a spark duration of a spark plug included in an ignition system, the spark plug coupled to a cylinder of the engine, the adjusting based on a reformate amount in a reformate storage tank. In a further example, a method for an engine includes adjusting a charge reformate concentration in a cylinder of the engine, the engine including an ethanol-based fuel reformate system including a reformate catalyst, the adjusting based on a spark duration of a spark plug included in an ignition system of the engine, the spark plug coupled to the cylinder.

An engine including a fuel reformer system, e.g., an ethanol based fuel reformate system, may increase charge ignitability by increasing reformate, thus alleviating the use of increased ignition system output. Consequently, lean burn, EGR, boost, VVC (or similar systems such as cam profile switching (CPS), variable cam timing (VCT), variable valve timing (VVT), variable valve lift (VVL), etc.) and the like may be more aggressively utilized while reducing potential engine misfire. For example, when operating with an increased reformate amount, higher EGR levels, and/or more retarded valve timing, may be used. Additionally, there is an unexpected synergy such that increased ignition output may be used to conserve reformate.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
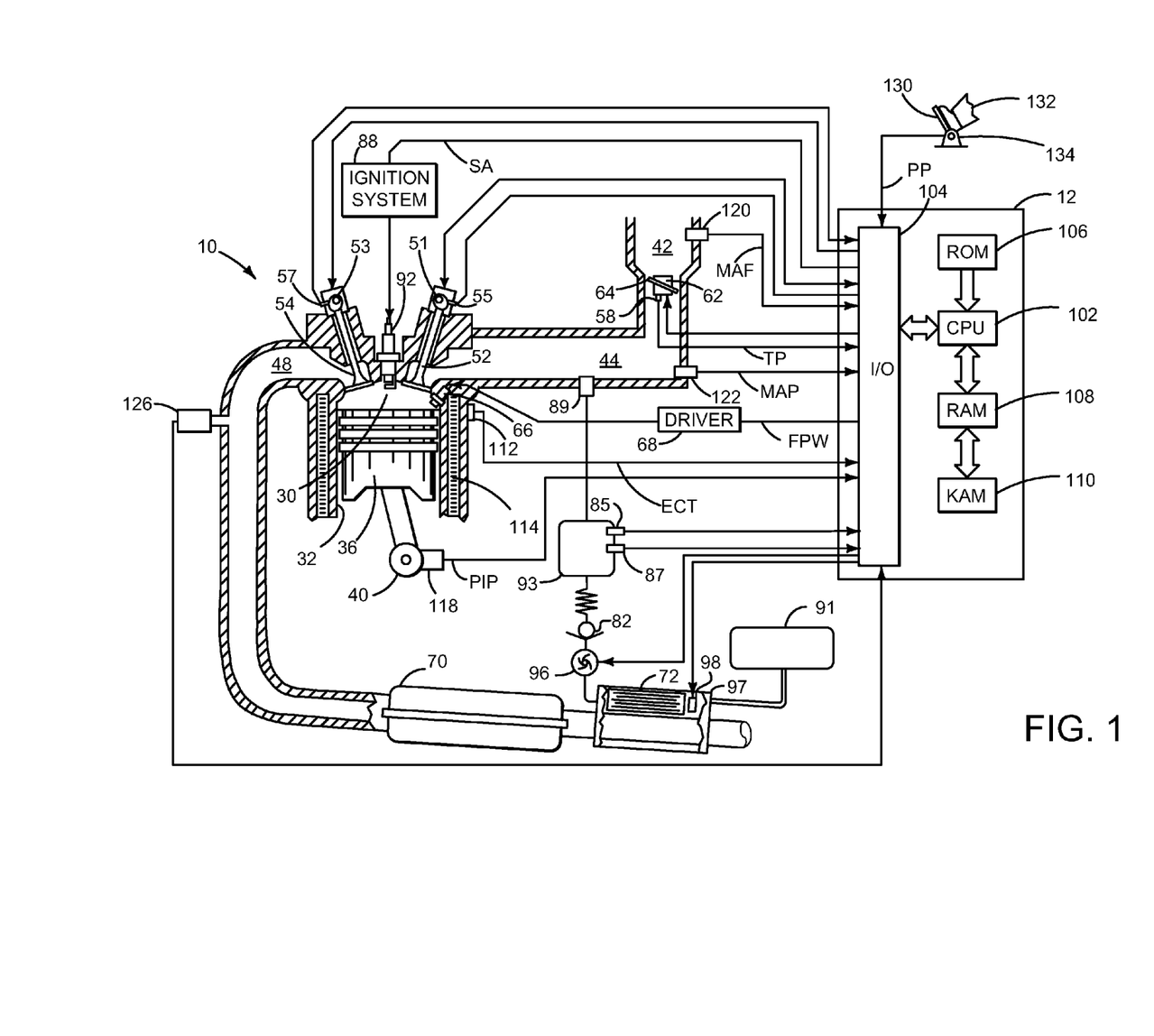
FIG. 1 shows engine systems.

In the present application, an example engine including fuel systems and devices for both liquid and gaseous fuel (e.g., hydrogen-rich reformate) is introduced and described with respect to FIG. 1. Next, a method for controlling such an engine in a first operating mode (e.g., adjusting ignition output based on engine conditions) and a second operating mode (e.g., adjusting boost, dilution, and reformate amount based on ignition output) is described with respect to FIG. 2. Further example methods for the first and second operating modes are described with reference to FIGS. 3 and 4, respectively.

Referring to FIG. 1, internal combustion engine 10, includes a plurality of cylinders, one cylinder of which is shown in FIG. 1. Internal combustion engine 10 is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation (EVA). For example, cylinder 30 may alternatively include an intake valve controlled via electric valve actuation and an exhaust valve controlled via cam actuation including CPS and/or VCT systems.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91, fuel pump (not shown), fuel lines (not shown), and fuel rail (not shown). The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Gaseous fuel may be injected to intake manifold 44 by way of fuel injector 89. In another embodiment, gaseous fuel may be directly injected into cylinder 30. One example of gaseous fuel is hydrogen-rich reformate, such as generated from reforming ethanol, or an ethanol/gasoline mixture, for example. Gaseous fuel is supplied to fuel injector 89 from storage tank 93 by way of pump 96 and check valve 82. Pump 96 pressurizes gaseous fuel supplied from an onboard fuel reformer 97 in storage tank 93. Check valve 82 limits flow of gaseous fuel from storage tank 93 to fuel reformer 97 when the output of pump 96 is at a lower pressure than storage tank 93. Fuel reformer 97 includes catalyst 72 and may further include optional electrical heater 98 for reforming liquid fuel (e.g., an alcohol, ethanol, methanol, or mixture thereof) supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic dehydrogenation of alcohol supplied by fuel tank 91 and to promote fuel reformation.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of reformer tank pressure from pressure sensor 85; a measurement of reformer tank temperature from temperature sensor 87; a measurement of air mass entering the engine from sensor 120; and a measurement of throttle position from sensor 62. Barometric pressure may also be sensed (sensor not shown) for processing by controller 12.

In a preferred aspect of the present description, engine position sensor 118 produces a predetermined number of equally spaced pulses every revolution of the crankshaft from which engine speed (RPM) can be determined. In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
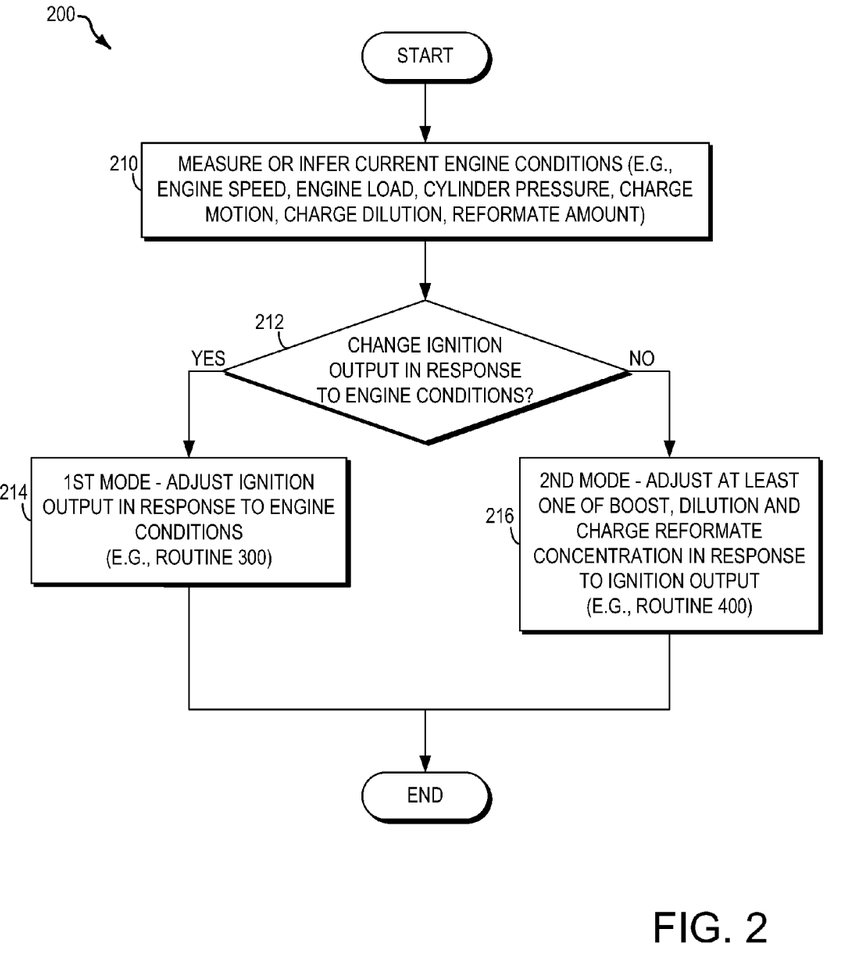
FIG. 2 illustrates a higher level routine for operating an engine.

Turning now to FIG. 2, a higher level routine 200 is shown, for operating an example engine (such as engine 10 described above with respect to FIG. 1). Routine 200 is one example of a method for operating ignition output, dilution, boost and reformate amount (such as the amount of reformate in the charge inducted into the cylinder, charge reformate concentration) in the example engine. In the present example, the engine includes a gaseous fuel that is a hydrogen-rich reformate.

Routine 200 begins at 210 by measuring or inferring current engine conditions and ignition output. Engine conditions include an engine speed, an engine load, a pressure inside one or more cylinders, FPW (for liquid and gaseous fuels), various charge motion properties (such as charge velocity, swirl, and tumble), charge dilution (e.g., due to lean burn, VVC, and EGR), and a volume of reformate in an example storage tank (e.g., a reformate amount). The charge motion may be based on a position of a charge motion control valve coupled in the engine intake port. Further, ignition output controls spark energy in an example spark plug. Ignition output may be characterized by parameters including a breakdown voltage between terminals of the spark plug, a peak current running through a secondary coil electrically coupled to the spark plug and a spark duration in the spark plug. In alternate examples, spark duration may be determined for each of a number of quickly succeeding spark discharges, and may be augmented by a parameter determining the number of sparks across the spark plug during a given four stroke cycle.

After 210, the routine includes determining if ignition output should be adjusted in response to engine conditions at 212. In one example, 212 includes determining if a reformate amount in a storage tank of the example engine is above a transition threshold. If the amount is below the transition threshold, the routine continues to 214 to adjust ignition output in response to engine conditions; otherwise routine 200 continues to 216 to adjust at least one of boost, dilution and charge reformate concentration in response to ignition output. In the present example, one advantage is that a certain amount of reformate is available for use to control charge ignitability in a combustion chamber by increasing the total amount of fuel in the charge and/or increasing the percentage of fuel in the charge that is reformate. In this way, charge reformate concentration alters charge ignitability in addition to, or in place of, adjusting ignition output based on charge ignitability (e.g., increasing spark duration).

Additionally, routine 200 may include hysteresis. For example, during measuring or inferring of current engine conditions and ignition output included at 210, the routine may include measuring if the engine is or has recently adjusted ignition output in response to engine conditions (e.g., first mode included at 214) or adjusted at least one of boost, dilution and charge reformate concentration in response to ignition output (e.g., second mode included at 216). Depending on if the engine is operating in the first or second mode, the valve of a transition threshold included at 212 may increase or decrease. One advantage of such a variable transition threshold is that an increase in reformate production may be ensured before increasing reformate use, or conversely that reformate is used effectively to limit adjusting ignition output adjusting/modulation.

In an additional example, 212 may include determining if the engine is in a performance mode or not. A performance mode may include a demanded torque above a demanded torque threshold, or a performance flag activated, for example, by user toggling a user input or switch. In one such example, if the engine is in a performance mode, the routine 200 continues to 214, otherwise, the routine continues to 216. In further examples, 212 includes additional determinations of whether to adjust ignition output in response to engine conditions, such as if a current charge is ignitable given current ignition output and engine conditions, or if an engine system is in a limited engine output operating mode.

Returning now to routine 200, if at 212 ignition output is to be adjusted in response to engine conditions, routine 200 may continue to 214. 214 includes a first engine operating mode, adjusting ignition output in response to engine conditions. 214 may further include adjusting (e.g., increasing) spark duration in response to the reformate amount below a first reformate threshold. The first reformate threshold may be the same or different from the transition threshold. One example of the first operating mode is described below with respect to routine 300 illustrated in FIG. 3. After 214, routine 200 may end.

Figure 4:
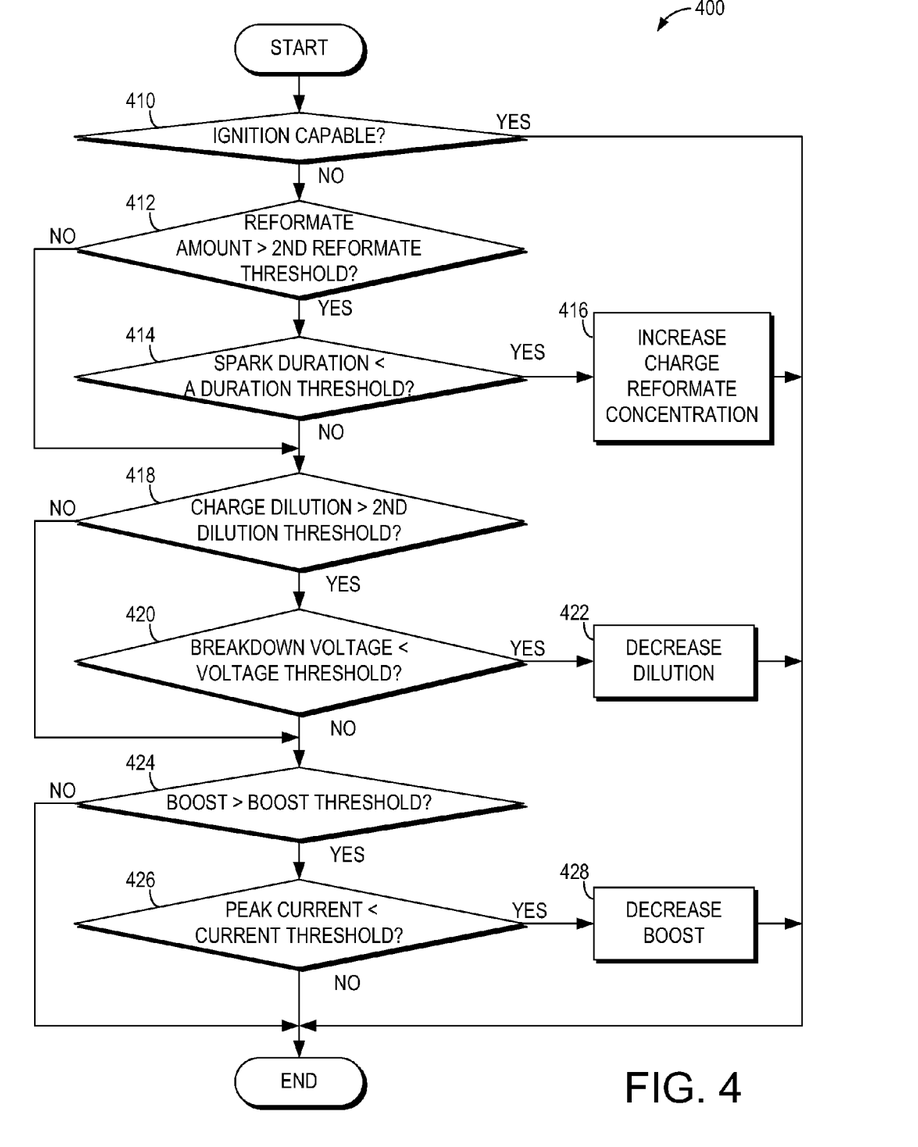
FIG. 4 illustrates an example routine for adjusting at least one of boost, dilution and charge reformate concentration based on ignition output.

If, at 212, ignition output is not to be adjusted in response to engine conditions, routine 200 may continue to 216. 216 includes a second engine operating mode, adjusting at least one of boost, dilution, and charge reformate concentration in response to ignition output. In one example, 216 includes increasing a charge reformate concentration in the cylinder of the engine in response to the spark duration less than a duration threshold. In a further example, 216 includes decreasing charge reformate concentration in response to the reformate amount less than a second reformate threshold (described in more detail below). Additionally, routine 400 described below with respect to FIG. 4 is one example of the second operating mode. After 216, routine 200 may end.

Figure 3:
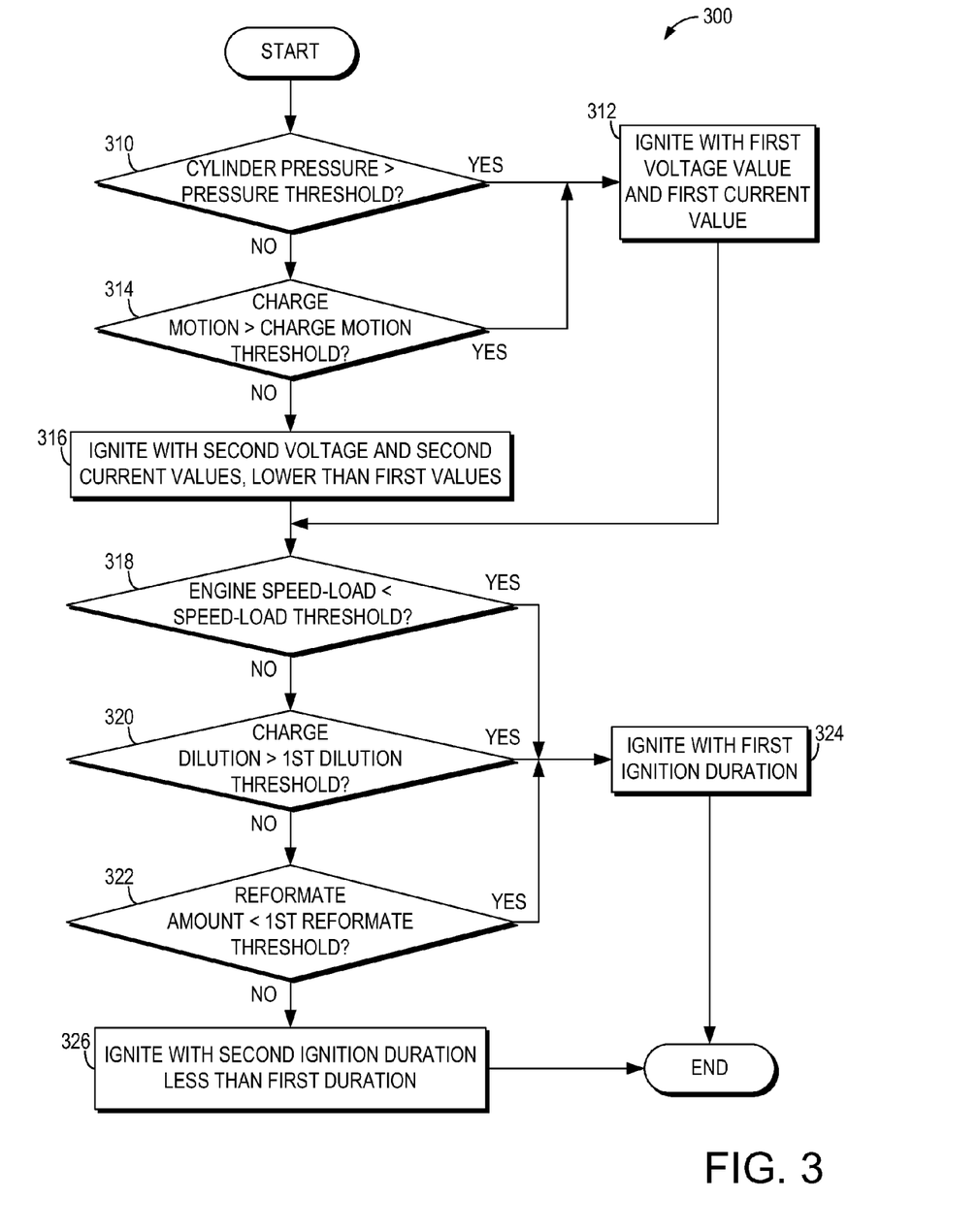
FIG. 3 illustrates an example routine for adjusting ignition output based on engine conditions.

Turning now to FIG. 3, an example routine 300 is shown. Routine 300 is one example of a method for adjusting ignition output based on engine conditions in an example engine. The example engine includes a fuel reformer system, including catalyst, tank for storing gaseous fuel, etc., as described above with respect to FIG. 1. Adjusting ignition output includes increasing or decreasing breakdown voltage, peak secondary current, spark duration, number of sparks, and/or combinations thereof. Routine 300 may be a subroutine incorporated into a higher level routine (e.g., at 214 of routine 200, described above) or may be run independently. Further, routine 300 may be run in multiple iterations for continuous control of ignition output in response to engine conditions.

In the present example, routine 300 begins at 310 by determining if a pressure level in a cylinder of the engine is greater than a pressure threshold. In some examples routine 300 begins by measuring or inferring current engine conditions, e.g., 210 included in routine 200, described above. However, if routine 300 is a subroutine of a higher level routine, such as routine 200, measuring or inferring current engine conditions may be omitted, as shown in the present example. Sensor readings and measurements, such as described above with respect to FIG. 1, include UEGO, valve lift, valve timing, engine speed, MAP, FPW (for liquid and gaseous fuels), and air mass entering an intake. Further, sensor readings and measurements may be combined with static physical constants such as dimensions of a combustion chamber of the engine, physical constants for partial pressures of gaseous and liquid chemicals, etc. to calculate, for example, a cylinder pressure.

Returning to routine 300, at 310 cylinder pressure is compared to a pressure threshold. The pressure threshold may be a fixed value threshold, or may be variable depending on measured engine conditions. For example, the threshold may be a function of engine speed-load, dilution, and/or charge reformate concentration. The threshold value may be stored in a look up table or other standard method known to one skilled in the art.

If the cylinder pressure is greater than a pressure threshold, routine 300 continues to 312. In this way routine 300 includes one example of increasing at least one of a breakdown voltage and a peak secondary current in the spark plug in response to a cylinder pressure above a cylinder pressure threshold.

In the present example, 312 includes igniting with a first breakdown voltage and first peak current. Additional examples include separate, or independent, control of breakdown voltage and peak current, e.g., igniting with only one of the first breakdown voltage or the first peak current based on operating conditions. For example, during, or in response to, high engine loads and/or when spark is retarded, increased voltage may be used; however, in some examples, a decreased current may be sufficient. Similarly, during, or in response to, high engine speeds and/or when charge motion is higher, increased peak secondary current may be used; however, in some examples, a decreased breakdown voltage may be sufficient.

In the present example, the second voltage is less than the first voltage and the second current is less than the first current. Further, 312 may include setting one or more flags to ignite with a first breakdown voltage and/or a first peak current during the next ignition event. In some examples, routine 300 ends after 312.

In additional examples of routine 300, 312 includes incrementing at least one of breakdown voltage and peak current by a discrete voltage interval or a discrete current interval. Still further examples of routine 300 include proportionally increasing one or both of voltage and current. The increase may be proportional to cylinder pressure, and/or charge motion, for example. After 312, routine 300 continues to 318, described in more detail below.

If the cylinder pressure is not greater than a pressure threshold at 310, routine 300 continues to 314. Additionally, in further examples of routine 300, 314 may be run in parallel with 310 or done before 310. 314 includes determining if charge motion is greater than a charge motion threshold. Charge motion includes the motion with which gases move from an example intake manifold to an example combustion chamber, as well as vortex motion of these gases inside the combustion chamber (e.g., tumble and swirl). Charge motion may be inferred based on, for example, valve lift, valve opening timing and duration, valve overlap, MAP, charge motion control valve position, or others. If charge motion is greater than the charge motion threshold, then the routine may continue to 312, described above. In this way routine 300 includes one example of increasing at least one of a breakdown voltage and a peak secondary current in the spark plug in response to a charge motion above a charge motion threshold.

If charge motion is less than the charge motion threshold, then the routine may continue to 316. 316 includes igniting with the second voltage value and second current value. Further, 316 may include setting one or more flags to ignite with the second breakdown voltage and/or the second peak current during the next ignition event. In some examples, routine 300 ends after 316.

In additional examples of routine 300, 316 includes decrementing at least one of breakdown voltage and peak current by a discrete voltage interval or a discrete current interval. Still further examples of routine 300 include proportionally decreasing one or both of voltage and current. The decrease may be proportional to cylinder pressure, and/or charge motion, for example. After 316, routine 300 continues to 318, described in more detail below.

Continuing with routine 300, after 316 or 312, the routine continues to 318, which includes determining if an engine speed-load is less than a speed-load threshold. In some examples, speed-load may be inferred from engine speed, cylinder pressure in one or more cylinders, torque and demanded torque. The speed-load threshold may be static or dynamic, similar to the pressure threshold included at 310, and the charge motion threshold at 314, both described above.

If the engine speed-load is below the speed-load threshold, the routine 300 continues to 324. 324 includes igniting with a first spark duration. In additional examples, 324 may include setting one or more flags that indicate that a first spark duration should be used during the next ignition event. As discussed above with respect to 312, additional examples of routine 300 include incrementing spark duration by a discrete time interval at 324. Still further examples of routine 300 include increasing spark duration in proportion to engine speed-load, charge dilution and charge reformate concentration. After 324, routine 300 may end.

Routine 300 includes one example of increasing spark duration in response to an engine speed-load above a speed-load threshold (e.g., at 318 and 324). If the engine speed-load is not below the speed-load threshold at 318, the routine 300 continues to 320. 320 includes determining if a charge dilution is above a first dilution threshold. Charge dilution may include a percent EGR in the intake charge (relative to fresh air), for example. The first dilution threshold may be static or dynamic, similar to the pressure threshold included at 310, and the charge motion threshold at 314, both described above.

In the present example, if charge dilution is above the first dilution threshold, routine 300 continues to 324, described above. In this way, routine 300 includes one example of increasing spark duration in response to a charge dilution above a dilution threshold.

If charge dilution is not above the first dilution threshold, routine 300 continues to 322 which includes determining if a reformate amount is below a first reformate threshold. Reformate may be is stored an example storage tank. Determining reformate amount may be inferred from a tank pressure, or a flow rate out of the tank.

If the reformate amount is less than the first reformate threshold, the routine 300 continues to 324. In this way, routine 300 includes one example of increasing spark duration in response to the reformate amount below a reformate threshold.

If the reformate amount is not less than the first reformate threshold, the routine 300 continues to 326, igniting with a second spark duration less than the first spark duration. In additional examples of routine 300, 326 may include setting one or more flags to ignite with the second spark duration during the next ignition event. Further, 326 may include decrementing spark duration by a discrete time interval. Still further examples of routine 300, include proportionally decreasing spark duration at 326. The decrease may be proportional to speed-load, charge dilution, and reformate amount.

Further still, this is one example of decreasing spark duration in response to the reformate amount below the reformate threshold. Furthermore, 326 may include increasing charge reformate concentration. This is one example of how routine 300 includes increasing charge reformate concentration in response to the reformate amount above the reformate threshold. After 326, the routine may end.

Determining, at 322, if reformate is below a first reformate threshold and then igniting with either a first or second spark duration is one example of adjusting spark duration of an example spark plug included in an ignition system, the adjusting based on a reformate amount in a reformate storage tank. Further routines and methods include additional examples.

Routine 300 is one example of a routine for adjusting ignition output based on engine conditions. Because ignition output is modulated (e.g., spark duration is increased or decreased, etc.), reformate usage may be reduced. Further, aggressive use of lean burn, EGR, and the like may be sustained by modulating ignition output according to routine 300.

Turning now to FIG. 4, an example routine 400 is shown. Routine 400 is one example of a method for adjusting at least one of boost, dilution, and charge reformate concentration based on conditions in an example engine (e.g., ignition output). The present example engine includes an ignition system, a fuel reformer system, including catalyst, tank for storing gaseous fuel, etc., as described above with respect to FIG. 1. More specifically, routine 400 includes determinations based on engine conditions and conditions of one example combustion chamber of an example engine cylinder, an example spark plug coupled to the cylinder. Routine 400 may be a subroutine incorporated into a higher level routine (e.g., at 216 of routine 200, described above) or may be run independently. Further, routine 400 may be run repeatedly for continuous control of at least one of boost, dilution and charge reformate concentration based on ignition output.

In the present example, routine 400 begins at 410 by determining if ignition of an example charge in a cylinder is capable. In some examples routine 400 begins by measuring or inferring current engine conditions, e.g., 210 included in routine 200, described above. However, if routine 400 is a subroutine of a higher level routine, such as routine 200, measuring or inferring current engine conditions may be omitted, as shown in the present example. Sensor readings and measurements, such as described above with respect to FIG. 1, include UEGO, valve lift, valve timing, engine speed, MAP, FPW (for liquid and gaseous fuels), and air mass entering an intake. Further, sensor readings and measurements may be combined with static physical constants such as dimensions of a combustion chamber of the engine, physical constants for partial pressures of gaseous and liquid chemicals, etc. to calculate, for example, a cylinder pressure.

Returning to 410, determining if ignition is capable may be inferred by, for example, breakdown voltage, peak secondary current, spark duration, FPW (for liquid and gaseous fuels), valve lift, valve opening duration, valve overlap, MAP, air mass, and UEGO. In one example, the routine may determine whether potential for engine misfire due to insufficient ignition energy is above a threshold for the current operating conditions. If ignition is capable, then the routine 400 may end. If ignition is not capable, routine 400 continues to 412.

At 412, routine 400 includes determining if a reformate amount is above a second reformate threshold. The second reformate threshold may be different than an example first reformate threshold (described above with reference to routine 300) and an example transition threshold (described above with references to routine 200); for example the second threshold may be less than both an example first reformate threshold and an example transition threshold. If the reformate amount is not greater the second threshold, routine 400 continues to 418.

In further examples of routine 400, a charge reformate concentration is decreased before routine 400 continues from 412 to 418. In this way routine 400 may include decreasing charge reformate concentration in response to a reformate amount less than a second reformate threshold.

In the present example, if the reformate amount is greater than the second reformate threshold, routine 400 continues to 414 to determine if spark duration in an example combustion chamber is less than a duration threshold. If spark duration is less than the duration threshold, routine 400 continues to 416 to increase charge reformate concentration. In further examples of routine 400, 414 includes determining at least one of if a breakdown voltage is below a breakdown threshold and if a peak secondary current is below a current threshold.

Increasing charge reformate concentration at 416 includes using a first charge reformate concentration greater than a second charge reformate concentration. In additional examples, 416 may include setting one or more flags that indicate that a first charge reformate concentration is used during the next ignition event (e.g., the immediately following ignition event in a given cylinder). Additional examples of routine 400 include incrementing charge reformate concentration by a discrete amount at 416. Still further examples of routine 400 include increasing charge reformate concentration in proportion to engine breakdown voltage, peak secondary current and/or spark duration. After 416, the routine may end. In further examples of routine 400, after 416 the routine may continue to 418.

Determining if spark duration is less than the duration threshold (e.g., at 414) and increasing charge reformate concentration in response (e.g., at 416) is one example of adjusting a charge reformate concentration in the cylinder of the example engine, the adjusting based on a spark duration of an example spark plug.

Continuing with routine 400, at 418, the routine includes determining if a charge dilution is greater than a second dilution threshold. The second dilution threshold may be different than an example first dilution threshold (described above with reference to routine 300); for example the second dilution threshold may be less than the example first dilution threshold. The second dilution threshold may be static or dynamic. If the charge dilution amount is not greater than the second threshold, routine 400 continues to 424. In further examples of routine 400, a charge dilution is increased before routine 400 continues from 418 to 424. In this way routine 400 may include increasing charge dilution in response to a charge dilution not greater than the second dilution threshold.

In the present example, if the charge dilution is greater than the second dilution threshold, routine 400 continues to 420 to determine if a breakdown voltage is less than a voltage threshold. If breakdown voltage is less than the voltage threshold, routine 400 continues to 422 to decrease dilution. In further examples of routine 400, 420 includes determining at least one of if a spark duration is below a duration threshold, and if a peak secondary current is below a current threshold.

Decreasing dilution at 422 includes using a second dilution less than a first dilution. In additional examples, 422 may include setting one or more flags that indicate that a second dilution should be used during the next ignition event. Additional examples of routine 400 include decrementing dilution by a discrete amount at 422. Still further examples of routine 400 include decreasing dilution in proportion to engine breakdown voltage, peak secondary current and/or spark duration. After 422, the routine may end. In further examples of routine 400, after 422, the routine continues to 424.

Determining if charge dilution is less than the dilution threshold (e.g., at 418) and decreasing dilution in response (e.g., at 422) is one example of decreasing dilution in response to at least one of a spark duration below a spark duration threshold, a spark voltage below a voltage threshold and a peak current below a current threshold.

If breakdown voltage is not less than a voltage threshold at 420, then routine 400 continues to 424. 424 includes determining if a boost amount is greater than a boost threshold. The boost threshold may be static or dynamic. If boost is not greater the boost threshold, routine 400 may end. In further examples of routine 400, a boost amount is increased after 424 and before routine 400 ends. In this way routine 400 may include increasing boost in response to boost not greater than the boost threshold.

In the present example, if the boost is greater than the boost threshold, routine 400 continues to 426 to determine if peak current is less than a current threshold. If peak current is less than the current threshold, routine 400 continues to 428 to decrease boost. In further examples of routine 400, 426 includes determining at least one of if a spark duration is below a duration threshold, and if a breakdown voltage is below a voltage threshold. If peak current is not less than the current threshold, routine 400 may end.

Decreasing boost at 428 includes using a second boost amount less than a first boost amount. In additional examples, 428 may include setting one or more flags that indicate that the second boost amount should be used during the next ignition event. Additional examples of routine 400 include decrementing boost by a discrete amount at 428. Still further examples of routine 400 include decreasing boost in proportion to engine breakdown voltage, peak secondary current and/or spark duration. After 428, the routine may end.

Determining if boost is less than the boost threshold (e.g., at 424) and decreasing dilution in response (e.g., at 428) is one example of decreasing boost in response to at least one of a spark duration below a spark duration threshold, a breakdown voltage below a voltage threshold and a peak secondary current below a current threshold.

The present example of routine 400 is only one example of a routine for adjusting at least one of boost, dilution and charge reformate concentration based on ignition output. In the present example, adjusting spark duration in response to spark duration occurs before adjusting breakdown voltage and/or peak current in response to charge dilution. In turn, adjusting breakdown voltage and/or peak current in response to charge dilution occurs before adjusting peak current and/or break down voltage in response to boost. In further examples, each of these three processes may be done in parallel, or may be ordered differently.

In this way, parasitic efficiency losses and spark plug erosion may be lessened because ignition output is lessened under some running conditions. Further, ignition output range may be lessened, decreasing ignition systems costs while still operating over wide range of engine conditions, such as during aggressive use of lean burn, EGR, variable valve control, and boost and avoiding misfires, excessive spark plug electrode erosion and the like.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for an engine, the method comprising:
adjusting a reformate amount in a cylinder of the engine, the engine coupled to a fuel reformer system, the adjusting based on a spark duration of a spark plug included in an ignition system of the engine, the spark plug coupled to the cylinder; and
decreasing a percent of EGR in an intake charge relative to fresh air in response to at least one of the spark duration below a spark duration threshold, a spark voltage below a voltage threshold and a secondary peak current below a current threshold.

2. The method of claim 1, where the reformate amount is produced by an onboard reformer reforming an ethanol fuel.

3. A method for an engine, the method comprising:
adjusting a reformate amount in a cylinder of the engine, the engine coupled to a fuel reformer system, the adjusting based on a spark duration of a spark plug included in an ignition system of the engine, the spark plug coupled to the cylinder; and
further comprising decreasing boost in response to at least one of the spark duration below a spark duration threshold, a breakdown voltage below a breakdown threshold and a peak secondary current below a current threshold.

4. The method of claim 3, where the reformate amount is produced by an onboard reformer reforming an ethanol fuel.

5. A method for an engine and a fuel reformer, comprising:
adjusting a spark duration of a spark plug included in an ignition system, the spark plug coupled to a cylinder of the engine, the adjusting based on a reformate amount in a storage tank and engine speed.

6. The method of claim 5, wherein the storage tank is coupled to the fuel reformer, the method further comprising increasing the spark duration in response to the reformate amount below a reformate threshold, and decreasing the spark duration in response to the reformate amount above the reformate threshold.

7. The method of claim 6 further comprising decreasing reformate concentration in the cylinder in response to the reformate amount below the reformate threshold.

8. The method of claim 5, further comprising increasing at least one of a breakdown voltage and a peak secondary current in the spark plug in response to a charge motion above a charge motion threshold.

9. The method of claim 5, further comprising increasing at least one of a breakdown voltage and a peak secondary current in the spark plug in response to a cylinder pressure above a cylinder pressure threshold.

10. The method of claim 5, further comprising increasing the spark duration in response to an engine speed-load below a speed-load threshold.

11. The method of claim 5, further comprising increasing the spark duration in response to a charge dilution above a dilution threshold.

12. The method of claim 5, where the reformate amount is produced by an onboard reformer.

* * * * *